March 5, 1940.   E. R. WARNER   2,192,282
WHEEL MOUNTING FOR AIRPLANES
Filed April 11, 1938
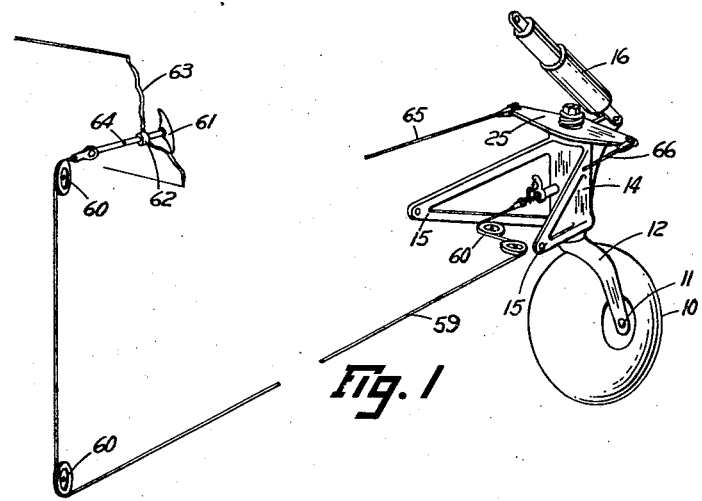
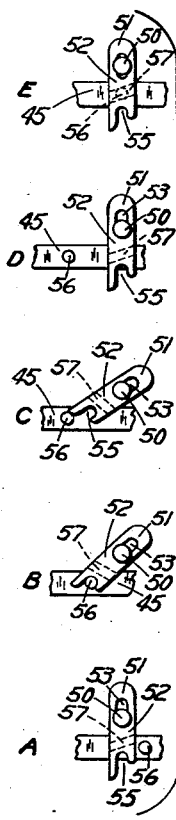
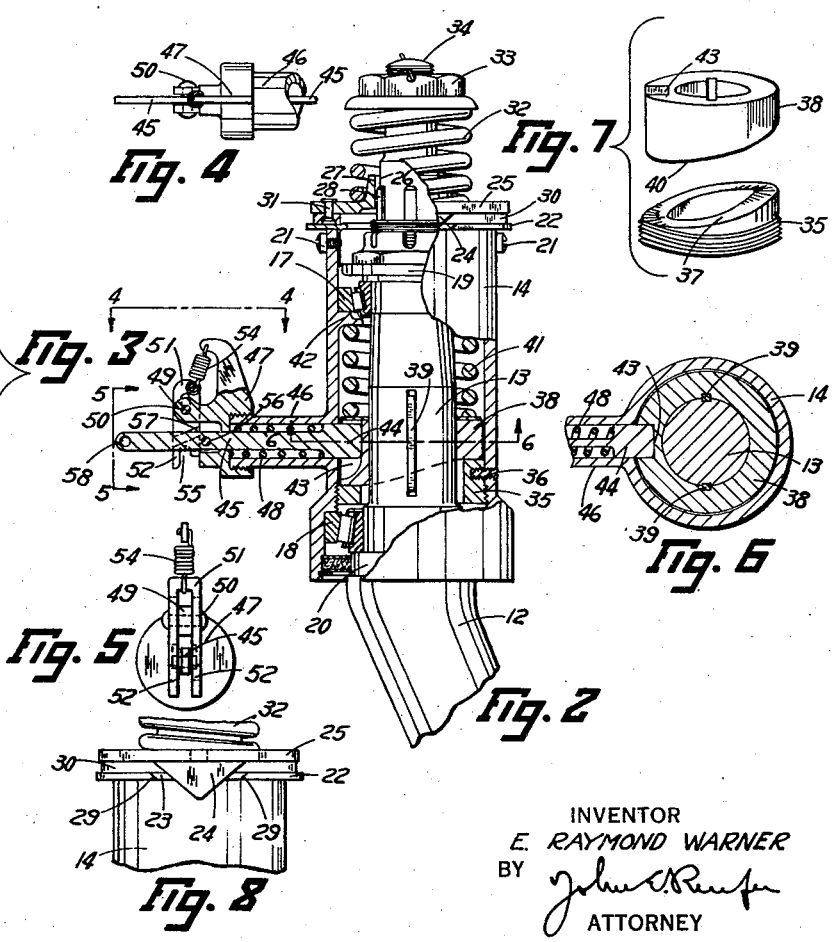
INVENTOR
E. RAYMOND WARNER
BY
ATTORNEY Patented Mar. 5, 1940

2,192,282

UNITED STATES PATENT OFFICE 2,192,282

WHEEL MOUNTING FOR AIRPLANES

E. Raymond Warner, Cleveland, Ohio, assignor to The Cleveland Pneumatic Tool Company, Cleveland, Ohio, a corporation of Ohio Application April 11, 1938, Serial No. 201,257

4 Claims. (Cl. 244—109)

This invention relates broadly to aircraft, but more particularly to a new and improved nose or tail wheel assembly for use with airplanes.

One object of this invention is to produce an improved nose or tail wheel assembly including a mechanism for positively locking the wheel in central position, thereby facilitating landing on or take-off from narrow places or fields where lateral movement of the nose or tail wheel tending to steer the airplane out of its straight course would render such landing or take-off very hazardous. This mechanism being capable of release to enable lateral rotation of the wheel necessary when making a sharp turn in taxiing.

Another object of this invention is to produce a mechanism for locking a nose or tail wheel in central position but capable of release to enable lateral rotation of the wheel, the operation of the mechanism being governed by remote controls located inside of the airplane within reach of the pilot.

Another object of this invention is to produce a steerable nose or tail wheel assembly wherein the steering mechanism is capable of release from the wheel to enable lateral rotation of the wheel independently of the steering mechanism, the assembly including a locking device through which the wheel may positively be locked against lateral rotation.

Other objects and advantages more or less ancillary to the foregoing reside in the specific construction and aggroupment of the elements peculiar in this structure, as will become apparent from a more complete examination of this specification.

In the drawing:

Fig. 1 is a perspective diagrammatical view of a tail wheel assembly embodying the invention.

Fig. 2 is an enlarged side elevational view of a tail wheel post partly in section to show details of construction.

Fig. 3 is a view illustrating different positions of the locking dog shown in Fig. 2.

Fig. 4 is a view looking in the direction of the arrows 4—4 in Fig. 2.

Fig. 5 is a view looking in the direction of the arrows 5—5 in Fig. 2.

Fig. 6 is a cross sectional view taken in a plane indicated by line 6—6 in Fig. 2.

Fig. 7 is a perspective view illustrating parts of the self centering mechanism shown in Fig. 2.

Fig. 8 is a side elevational view of the upper end of the tail wheel post shown in Fig. 2.

Referring to the drawing in which like symbols designate corresponding parts throughout the several views, 10 represents a landing wheel rotatable on a cross shaft 11 supported by a wheel knuckle 12 of any suitable shape. The upper end of the knuckle 12 is machined to form a spindle 13 rotatably mounted within a post or housing 14, which may be secured to the airplane by any suitable means such as braces 15 and a shock absorber 16.

Held in operative position within the housing 14, there are two anti-friction bearings 17 and 18 within which the spindle 13 is journaled and operatively supported against axial movement relative to the housing 14 by a nut 19 screwed on the spindle in operating engagement with the upper bearing 17, and an annular step 20 formed on the spindle and engaging the lower bearing 18.

Secured on the upper end of the housing 14 by screws 21, there is a disk 22 extending laterally beyond the housing and formed with two diametrically opposed cut-away sections 23, each adapted to receive a cam projection 24 formed integral with and depending from a steering arm 25 mounted on the upper end portion of the spindle 13, which portion protrudes from the upper end of the housing 14. This steering arm is formed with a central bore 26 having splines 27 cut therein and normally in operative engagement with similar splines 28 formed on the spindle 13. As shown in Fig. 8, the width of the cut-away sections 23 is materially greater than the width of the cam projections 24, allowing the steering arm 25 and wheel knuckle 12 to rotate within a predetermined arc before the cam projections 24 engage the side walls 29 of the cut-away sections 23, which side walls are shaped parallel to the corresponding side walls of the cam projections 24. Interposed between the steering arm 25 and the disk 22, there is a friction washer 30 secured to the under side of the steering arm 25 by rivets 31, which washer is normally maintained in frictional engagement with the disk 22 by a compression spring 32 located between the steering arm 25 and a nut 33 screwed on the threaded end 34 of the spindle 13.

Screwed within the lower end of the housing 14, there is a ring 35 held in position by a screw 36 and having its upper end face shaped as a cam 37. On this ring rests a similar locking ring 38 axially slidable on the spindle 13 but locked thereon against relative rotation by two keys 39. The lower end face of the locking ring 38 is also shaped like a cam 40 constantly urged into operative engagement with the cam 37 by a compression spring 41 interposed between the ring 38 and an annular shoulder 42 formed within the housing 14.

On its peripheral wall, the locking ring 38 is provided with a longitudinally disposed slot 43 adapted to receive the head 44 of a plunger 45 slidable within an apertured boss 46 formed integrally with the housing 14 and extending laterally therefrom. The plunger 45, which is of rectangular cross section, extends through a bracket 47 rigidly affixed on the free end of the boss 46 and forming a seat for a compression spring 48 acting on the head 44 of the plunger for constantly urging it into the slot 43.

The bracket 47 is formed with a lug 49 carrying a cross shaft 50. Pivotally and slidably carried on the cross shaft 50, there is a U-shaped dog 51 having side arms 52 disposed in straddle relation with the lug 49 and formed with an elongated slot 53 having the cross pin 50 extending therethrough. Attached to the closed end of the dog 51, there is a tension spring 54 adequately carried by the bracket 47 and normally maintaining the dog in the position shown in Fig. 2. The free ends of the dog's arms 52 are formed with a notch 55 adapted to receive the ends of a cross pin 56 carried by the plunger 48, which plunger is slidable between the arms 52. The cross pin 56 is shorter than the width of the dog 51 and is capable to pass from one to the other side of the dog through an inclined groove 57 formed on the inner wall of each dog's arm 52.

The free end of the plunger 45 has a hole 58 extending therethrough for receiving one end of a cable 59 supported by pulleys 60 carried by the airplane, while the other end of the cable is attached to a handle 61 slidable within a socket 62 fastened on the instrument board 63 of the airplane, and within which may be mounted a spring pressed plunger (not shown) movable into a notch 64 formed on the shank of the handle 61.

To the steering arm 25 are also affixed cables 65 and 66 leading to adequate controls (not shown) within the craft through which the steering arm may be rotated.

In the operation of the device, it will be understood that when the parts are positioned as shown in Fig. 2, the plunger-head 44 being located within the slot 43 of the ring 38 will prevent rotation of the wheel knuckle 13 relative to the housing 14. In this instance, the position of the slot 43 relative to the plunger 48 is calculated to bring the wheel 10 in central position relative to the airplane which wheel is now locked against lateral rotation, a feature which has been found advantageous when landing or taxiing on and taking-off from a narrow field. With the plunger 48 located within the slot 43, the dog 51 is positioned as shown in Fig. 3, position A, relative to the cross pin 56 carried by the plunger 45.

When it is desired to release the spindle 13 from its locked relation with the housing 14, the handle 61 may be pulled out of its socket 62 until the spring pressed plunger within the socket 62 drops into the notch 64. This outward movement of the handle will effect, through the cable 59, the outward movement of the plunger 45 relative to the slot 43. Simultaneously, the cross pin 56 carried by the plunger 45 will rotate the dog 51 in a clockwise direction in Fig. 2, until the cross pin 56 drops into the notches 55 as illustrated in Fig. 3, position B. In this position of the dog 51, the cross pin 56 movable only axially with the plunger 45 will prevent rotation of the dog in a counter-clockwise direction, thereby automatically maintaining the plunger 45 out of the slot 43 or in released position relative to the spindle 13 without further help from the operator.

When it is desired to again lock the spindle 13 against rotation relative to the housing 14, the operator will pull the handle 61 to the extreme end of its outward movement and release the same. During the outward movement of the handle which is again transmitted to the plunger 45 by the cable 59, the cross pin 56 will move out of the notches 55 as shown in Fig. 3, position C. After the cross pin is moved beyond the dog 51, the tension spring 54 will return the dog in its original position as shown in Fig. 3, position D, and when the handle 61 is released, the compression spring 48 acting on the head 44 of the plunger 45, will drive the plunger into the slot 43. During this return movement of the plunger 45, the cross pin 56 will pass through the dog 51 via the incline grooves 57, causing a slight slidable movement of the dog possible by virtue of the elongated slots 52 within which is accommodated the cross shaft 49.

With the plunger 45 located as shown in Fig. 3, position B, that is in the released position relative to the spindle 13, the wheel 10 is capable of lateral oscillations or may be steered within an arc determined by the space existing between the inclined side walls 29 of the cut-away sections 23 and the cam projections 24. This lateral movement of the wheel 10, is normally checked by the friction washer 30 in operative engagement with the disk 22, and by the action of the spring pressed cam surface 40 of the locking ring 38 on the cam surface 37 of the stationary ring 37, which cam surfaces are shaped in a manner calculated to constantly urge the wheel 10 into central position.

When it is desired to have the wheel 10 rotatable laterally within a greater arc or to caster independently of the steering arm 25, this arm may be rotated until its cam projections 24, riding the inclined side walls 29 of the cut-away sections 23, are positioned on top of the ring 22. In this instance, the splines 27 are moved axially out of engagement with the splines 28, and the friction washer 30 out of engagement with the disk 22, allowing a relatively free swiveling movement of the wheel 10 checked only by the camming action of the locking ring 38 on the stationary ring 35.

In practice, with the steerable knuckle construction above described, it may be desirable to eliminate the self centering device formed by the cooperating cam surfaces 37 and 40. In this instance, the engaging end surfaces of the rings 35 and 38 may be made straight, thereby allowing free lateral rotation of the wheel 10.

After the operator has pulled the handle 61 at the end of its outward movement and released the same, the plunger head 44 will ride the peripheral wall of the locking ring 38 until the slot 43 is in proper position to receive the head of the plunger. When the device includes the self centering device shown in Fig. 8, the cam surface 40 of the ring 38, spring pressed on the cam surface 37 of the stationary ring 35, will automatically return the wheel 10 into central position and allow the plunger's head 44 to drop into the slot 43. In the event the self centering device is eliminated, the operator will, through the medium of the cables 65 and 66, rotate the steering arm 25 to cause reengagement of the splines 27 and 28, which splines are disposed in a manner enabling such reengagement only in one predetermined position of the steering arm 25 relative to the spindle 13. After reengagement of the splines 27 and 28, the wheel 10 may be steered into central position, with the slot 43 in position to receive the plunger's head 44.

From the foregoing description, it will be understood that through the locking mechanism including the plunger 45, the wheel 10 may positively be locked in central position, which mechanism is capable of release to enable lateral rotation or swinging movement of the wheel. As explained above, this locking may be used with a steerable wheel knuckle, or with a non-steerable knuckle wherein the groove 43 is urged into proper position to receive the plunger 45 by the self centering device including the cam shaped rings 35 and 38. It will also be understood that the operation of the locking mechanism is governed by remote controls located into the airplane within the reach of the pilot, enabling the wheel to be locked while the airplane is in flight preparatory to landing, and after landing enabling the wheel to be released for taxiing. Through the novel construction including the dog 51, the locking plunger 45 is automatically maintained either into or out of locking position.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A wheel assembly for aircraft including a housing fixed to the craft, a wheel supporting knuckle rotatably carried by said housing, rotation preventing means between said housing and knuckle including a member radially slidable relative to said housing movable into or out of locking position, spring means normally maintaining said member in locking position, and a locking dog carried by said housing engageable with means fixed on said member upon movement of the member out of locking position for automatically maintaining said member in said last position.

2. A wheel assembly for aircraft including a housing fixed to the craft, a wheel, a support for said wheel rotatably carried by said housing, wheel steering means operatively associated with said support and capable of release to enable lateral swinging movement of the wheel independently of said steering means, a locking plunger operatively associated with said housing and support for releasably locking said wheel against lateral movement, spring means operatively maintaining said locking plunger in operative position, means operable from the cockpit of the craft for effecting the release movement of said plunger, and a dog movably carried by said housing engageable with means fixed on said plunger upon its release movement for automatically maintaining said plunger in released position.

3. A wheel assembly for airplanes including a housing, a wheel, a support for said wheel carried by said housing in a manner enabling the wheel to assume a central position but allowing lateral swinging movement of the wheel under abnormal loads, self-centering means for said wheel including a pair of interengaging cams one fixed to the housing and the other slidable on the support against relative rotation with respect thereto, spring means active on the slidable cam maintaining it in operative engagement with the other cam, a recess on the slidable cam, a locking plunger slidably carried by said housing extending in said recess for preventing swinging movement of said wheel, said plunger being capable of slidable movement out of said recess to enable said swinging movement, and means operative by virtue of said slidable movement for automatically maintaining said plunger out of said recess.

4. A wheel mounting for airplanes including a housing, a wheel knuckle including a spindle rotatably mounted within said housing, means for constantly urging said spindle to a specific alignment about its center axis relative to said housing including a cylinder cam fixed to said housing, a component cam carried by said spindle against relative rotation with respect thereto but axially slidable thereon, and a compression spring within said housing active on said component cam for maintaining both cams in operative engagement.

E. RAYMOND WARNER.